(12) United States Patent
Zheng et al.

(10) Patent No.: US 12,399,394 B2
(45) Date of Patent: Aug. 26, 2025

(54) TILED APPARATUSES

(71) Applicant: TCL CHINA STAR OPTOELECTRONICS TECHNOLOGY CO., LTD., Guangdong (CN)

(72) Inventors: Feng Zheng, Guangdong (CN); Jun Zhao, Guangdong (CN); Bin Zhao, Guangdong (CN); Juncheng Xiao, Guangdong (CN); Hongyuan Xu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/263,176

(22) PCT Filed: May 16, 2023

(86) PCT No.: PCT/CN2023/094504
§ 371 (c)(1),
(2) Date: Jul. 27, 2023

(87) PCT Pub. No.: WO2024/216694
PCT Pub. Date: Oct. 24, 2024

(65) Prior Publication Data
US 2025/0085579 A1    Mar. 13, 2025

(30) Foreign Application Priority Data
Apr. 19, 2023   (CN) .......................... 202310461668.5

(51) Int. Cl.
*G02F 1/1333*    (2006.01)
*G02F 1/1335*    (2006.01)
(Continued)

(52) U.S. Cl.
CPC .... *G02F 1/13336* (2013.01); *G02F 1/133526* (2013.01); *G02F 1/133528* (2013.01);
(Continued)

(58) Field of Classification Search
CPC .................................................... G02F 1/13336
See application file for complete search history.

(56) References Cited

U.S. PATENT DOCUMENTS 8,797,234 B2 *   8/2014   Watanabe ............. G06F 1/1624
345/1.3
12,044,918 B2 *   7/2024   Zheng ................. G02F 1/13336
(Continued)

FOREIGN PATENT DOCUMENTS

CN   104299519 A   *   1/2015   .......... G09F 9/3026
CN   107945664 A   *   4/2018   .............. G09F 9/30
TW   201539403 A   *   10/2015

*Primary Examiner* — Mariceli Santiago
(74) *Attorney, Agent, or Firm* — PV IP PC; Wei Te Chung (57) ABSTRACT

A tiled apparatus is provided by the present disclosure. at least two of the tiled apparatus include display panels, backlight modules and lens parts. the display panel includes a display part and a tiled part. The tiled part is composed of transparent materials. An orthographic projection of the backlight module on the display panel covers the display part and at least a part of the tiled part. The lens part is disposed on a side of the display panel away from the backlight module and covers adjacent two tiled parts and a seam. The lens part partially overlaps with display parts of adjacent two display panels.

19 Claims, 7 Drawing Sheets

(51) Int. Cl.
*G02F 1/13357* (2006.01)
*G02F 1/1339* (2006.01)

(52) U.S. Cl.
CPC .. *G02F 1/133603* (2013.01); *G02F 1/133606* (2013.01); *G02F 1/13398* (2021.01)

(56) References Cited

U.S. PATENT DOCUMENTS

2010/0259566 A1* 10/2010 Watanabe ........... G02F 1/13336
 345/1.3
2017/0192136 A1* 7/2017 Tsai ................... G02B 27/1066

* cited by examiner

TILED APPARATUSES

CROSS REFERENCE TO RELATED APPLICATIONS

This application is a US national phase application based upon an International Application No. PCT/CN2023/094504, filed on May 16, 2023, which claims priority to Chinese Patent Application No. 202310461668.5, filed on Apr. 19, 2023. The entire disclosures of the aforementioned applications are incorporated herein by reference in their entireties.

TECHNICAL FIELD

The present disclosure relates to a field of display technologies, and in particular to tiled apparatuses.

BACKGROUND

At present, in order to achieve large-scale display of display devices, display splicing technology is rapidly developing. However, the tiled devices for organic light-emitting diode display panels and micro diode direct display panels cannot be widely promoted due to problems such as cost and reliability. Therefore, tiled devices for liquid crystal display panels are still mainstream products on the market.

In existing liquid crystal display tiled devices, seams between display screens are usually eliminated by electrical methods. However, an image brightness in a tiled area of the tiled display device by the technical solution is lower than that in a non-tiled area, leading to a technical problem of uneven display in the tiled device.

SUMMARY

The present disclosure provides a tiled apparatus to improve the technical problem of uneven display caused by inconsistent display brightness between a tiled area and a non-tiled area in the existing tiled device.

The present disclosure provides a tiled apparatus including at least two display devices tiled with each other. A seam is defined between adjacent two display devices, and each display device includes:
- a display panel including a display part and a tiled part located on a side of the display part, wherein tiled parts of the adjacent two display devices are adjacent to each other, and the tiled parts are composed of transparent materials; and
- a backlight module disposed on a side of the display panel away from a display surface, wherein an orthographic projection of the backlight module on the display panel covers the display part and at least a part of the tiled part, and light emitted from an area of the backlight module corresponding to the tiled part is capable of passing through the tiled part.

The tiled apparatus further includes a lens part disposed on a side of the display panel away from the backlight module, the lens part covers adjacent two tiled part and the seam, and the lens part overlaps with a part of display parts of adjacent two display panels.

DETAILED DESCRIPTION

To make the objectives, technical solutions, and effects of the present disclosure clearer and more specific, the present disclosure is described in further detail below with reference to the embodiments accompanying with drawings. It should be understood that the specific embodiments described herein are merely for explaining the present disclosure, and the present disclosure is not limited thereto.

In existing tiled devices, seams between display screens are usually eliminated by optical or electrical methods. However, the technical solution causes an image brightness in a tiled area to be lower than that in a non-tiled area, resulting in uneven display in the tiled apparatus. The present disclosure provides the following technical solutions to solve the foregoing technical problems.

Referring to FIGS. 1 to 10, the present disclosure provides a tiled apparatus 100, which includes at least two display devices 200 tiled with each other. A seam 130 is defined between adjacent two display devices 200. Each of the display devices 200 includes a display panel 10 and a backlight module 20 disposed on a side of the display panel 10 away from a display surface.

In the embodiment, the display panel 10 includes a display part 110 and a tiled part 120 located on a side of the display part 110. The tiled parts 120 of the two adjacent display devices 200 are adjacent to each other, and the tiled parts 120 are composed of transparent materials.

In the embodiment, an orthographic projection of the backlight module 20 on the display panel 10 covers the display part 110 and at least a part of the tiled part 120, and light emitted from an area of the backlight module 20 corresponding to the tiled part 120 is capable of passing through the tiled part 120. The backlight module 20 includes a plurality of light-emitting component, and the light emitted by the light-emitting component is capable of passing through the transparent materials of the tiled part 120 and being derived from a light emitting surface of the display panel 10.

In the embodiment, the tiled apparatus 100 further includes a lens part 30, which is disposed on a side of the display panel 10 away from the backlight module 20. The lens part 30 covers adjacent two tiled parts 120 and the seam, and the lens part 30 partially overlaps with the display part 110 of adjacent two display panels 10.

The tiled part 120 of the display panel 10 in the present disclosure is disposed to be transparent, so that the light emitted by the backlight module 20 corresponding to the tiled part 120 is capable of passing through the tiled part 120. And the lens part 30 guides the light passing through the tiled part 120 and part of display parts 110 to the tiled parts 120 and the seam 130 between adjacent tiled parts 120. While ensuring the continuity of the displayed image, the image brightness in a tiled area PP is improved, and the technical problem of uneven display of the tiled apparatus 100 is solved.

In the embodiment, the tiled part 120 is only equipped with transparent materials, and relevant metal wirings or non-transparent materials in the display panel may be disposed at a boundary of the non-tiled area.

In the embodiment, the backlight module 20 may include a plurality of light-emitting component, and the light emitted by the plurality of the light-emitting component is incident to the tiled parts 120 and the display parts 110 by optical diaphragms in the backlight module 20.

In the embodiment, the backlight module 20 may be a straight down backlight module or a side entry backlight module according to the position of the light-emitting component. When the backlight module 20 is the straight down backlight module, the light emitted from an area of the backlight module 20 corresponding to the tiled part 120 is capable of passing through the tiled parts 120 and enter the lens part 30. When the backlight module 20 is the side entry backlight module, a light guide plate of the backlight module 20 extends below the tiled part 120, the light guide plate and the tiled part 120 are overlapped, and the light emitted by the light-emitting component is guided to the tiled area PP through the light guide plate and incident to the tiled parts 120.

In the embodiment, the light-emitting component may be light-emitting diodes (LEDs), Mini LEDs, Micro LEDs, etc.

The technical solutions of the present disclosure are described in conjunction with specific embodiments.

The tiled apparatus 100 in the embodiment may be provided to be two display devices 200 tiled opposite to each other, four display devices 200 tiled in a Chinese character shape of "囲", or by other numbers of display devices 200 for tiling. The embodiment illustrates the technical solution of the present disclosure by two display devices 200 tiled relatively with each other.

Figure 1:
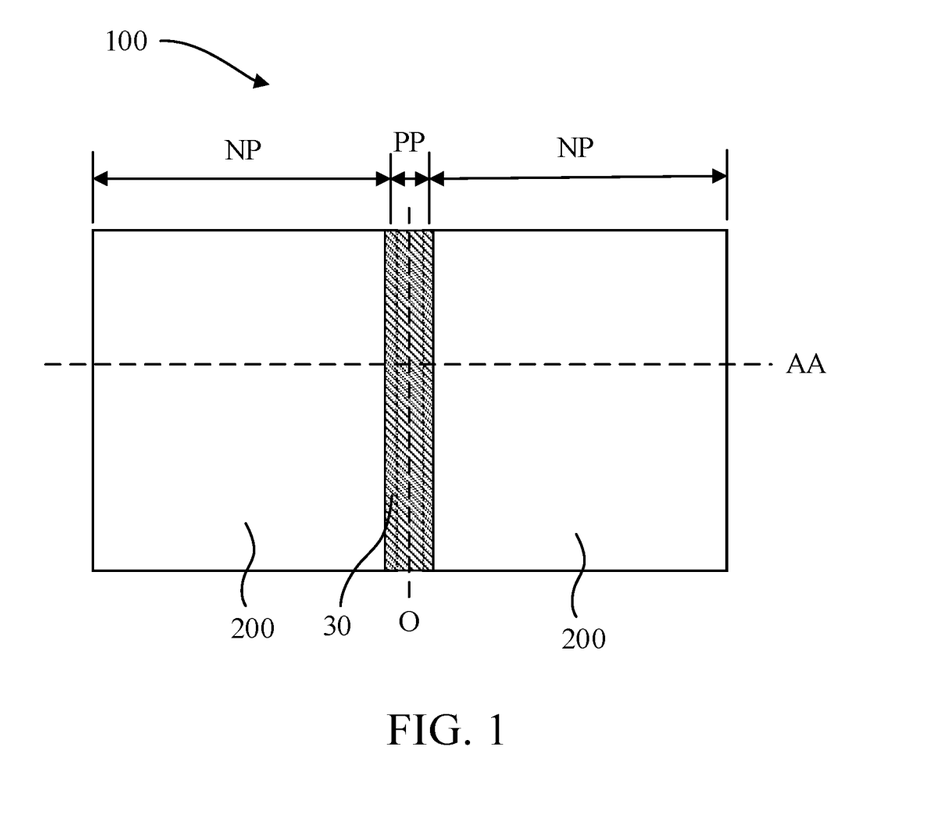
FIG. 1 is a top structural view of the tiled apparatus provided by the present disclosure.
Figure 2:
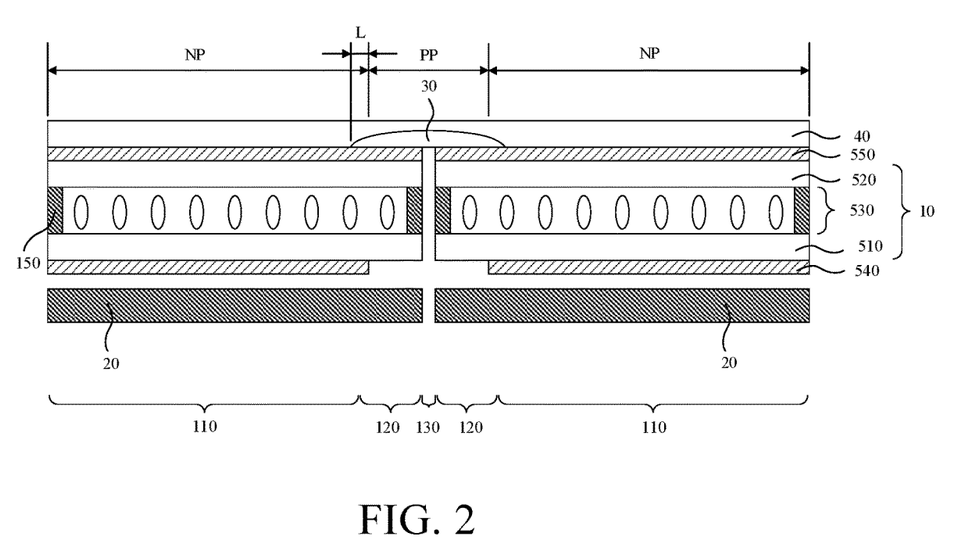
FIG. 2 is a first cross-sectional view of a section AA in FIG. 1.

Referring to FIGS. 1 and 2. The tiled apparatus 100 may include two display devices 200 tiled opposite to each other, and structures of the two display devices 200 may be the same. The tiled apparatus 100 may include the tiled area PP and the non-tiled area NP. The tiled area PP is provided with tiled parts 120 of the two display panels 10 and a seam 130 located between the two tiled parts 120, and the non-tiled area NP is provided with display parts 110 of the two display panels 10.

Figure 3:
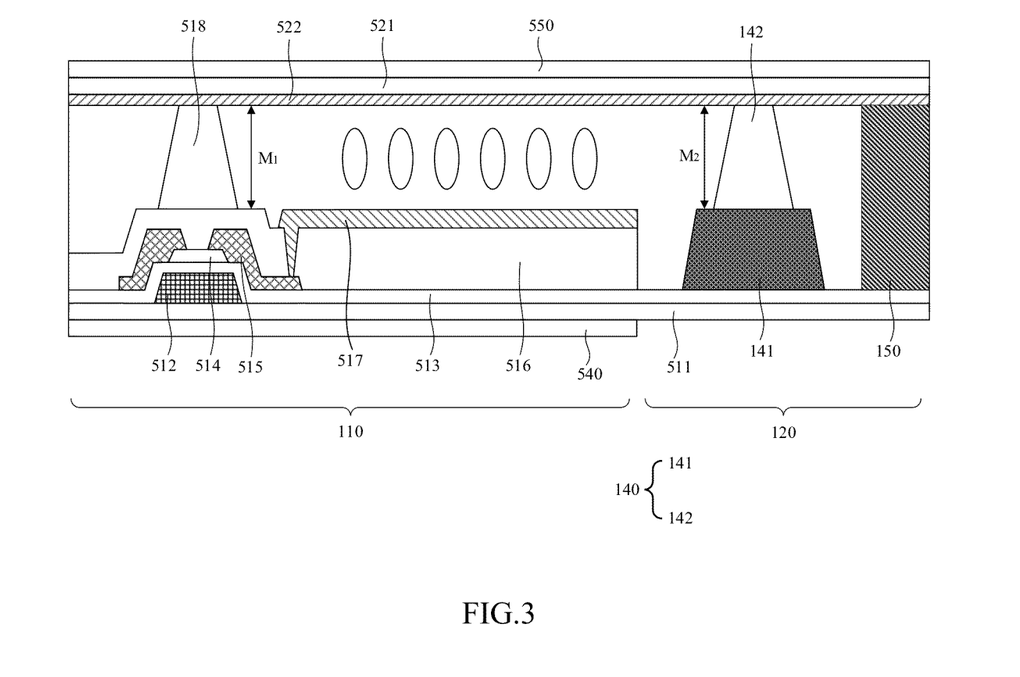
FIG. 3 is a cross-sectional view of a display panel of the tiled apparatus provided by the present disclosure.

Referring to FIG. 3. The display panel 10 may include a first substrate 510, a second substrate 520 opposite to the first substrate 510, and a liquid crystal layer 530 between the first substrate 510 and the second substrate 520. The first substrate 510 may be a conventional array substrate or a color filter on array (COA) substrate. In the following embodiment, the present disclosure takes the COA substrate as an example for explanation.

In the embodiment, the first substrate 510 may include a first substrate 511, a thin film transistor layer located on the first substrate 511. A material of the first substrate 511 may be made of glass, quartz or polyimide.

In the embodiment, the thin film transistor layer may include a plurality of thin film transistors. The thin film transistor may be an etching barrier type, a back channel etching type. or divided into structures such as a bottom gate thin film transistor, a top gate thin film transistor, etc. based on the position of the gate and active layer. For example, the thin film transistor which is the bottom gate thin film transistor type may include a gate layer 512 located on the first substrate 511, a gate insulation layer 513 located on the gate insulation layer 512, an active layer 514 located on the gate insulation layer 513, a source drain layer 515 located on the active layer 514, a color resistance layer 516 located on the source drain layer 515, and a pixel electrode layer 517 located on the color resistance layer 516. In other embodiments, a flat layer or other insulation film layers are furtherly disposed between the source drain layer 515 and the color resistance layer 516, which is not limited here. Secondly, other transparent insulation film layers such as the gate insulation layer 513 may extend from the display part 110 to the tiled part 120.

In the embodiment, the second substrate 520 may include a second substrate 521 and a common electrode layer 522 located on the second substrate 521. The electric field formed by the common electrode layer 522 and the pixel electrode layer 517 drives a deflection of liquid crystal molecules in the liquid crystal layer 530.

In the embodiment, a plurality of second main spacer columns 518 and sub spacer columns (not shown in the FIG.) are further provided between the first substrate 510 and the second substrate 520. A thickness of the sub spacer column is less than that of the second main spacer column 518, and the second main spacer column 518 is connected to the first substrate 510 and the second substrate 520.

In the tiled apparatus 100 of the present disclosure, referring to FIGS. 1 and 2, the display device 200 further includes a first polarizer 540 and a second polarizer 550 disposed on both sides of the display panel 10. The first polarizer 540 may be disposed between the display panel 10 and the backlight module 20, and the second polarizer 550 may be disposed between the display panel 10 and the lens part 30. At most one of the first polarizer 540 and the second polarizer 550 overlaps with the tiled part 120.

As the display panel 10 of the present disclosure is a liquid crystal panel, in order to achieve image display of the liquid crystal display panel, an upper polarizer and a lower polarizer are disposed on both sides of the liquid crystal panel. However, since the tiled part 120 is composed of transparent materials, and no corresponding thin film transistor is disposed on the tiled part 120 to control the deflection of the liquid crystal in the tiled part 120, when the upper polarizer and the lower polarizer are disposed on both sides of the tiled part 120, the polarized light entering the display panel 10 is not regulated by the liquid crystal, and the polarized light cannot pass through the upper polarizer, resulting in the inability of the light incident on the tiled part 120 to enter the lens part 30, which cannot solve the technical problem of inconsistent brightness between the tiled area PP and the non-tiled area NP.

In the embodiment, at most one of the first polarizer 540 and the second polarizer 550 of the present disclosure is provided to overlap with the tiled part 120. For example, referring to FIG. 4, the first polarizer 540 and the tiled part 120 are overlapped, and the light incident on the tiled part 120 passes through the first polarizer 540 to form polarized light. Since the second polarizer 550 and the tiled part 120 are not overlapped, even if the liquid crystal does not regulate the polarized light entering the display panel 10, the polarized light is capable of entering the lens part 30, to improve the technical problem of inconsistent brightness between the tiled area PP and the non-tiled area NP. Similarly, referring to FIG. 1, the second polarizer 550 and the tiled part 120 are overlapped, and the first polarizer 540 and the tiled part 120 are not overlapped. Alternatively, referring to FIG. 5, neither the first polarizer 540 nor the second polarizer 550 overlaps with the tiled part 120, allowing light incident to the tiled part 120 to enter the lens part 30 to improve the technical problem of inconsistent brightness between the tiled area PP and the non-tiled area NP.

In the embodiment, referring to the structure show in FIG. 2, the second polarizer 550 and the tiled part 120 are overlapped, and the first polarizer 540 and the tiled part 120 are not overlapped. The disposition of the second polarizer 550 may remove the ambient light shining on the tiled area PP and reduce the interference of ambient light on the display brightness of the tiled area PP.

In the tiled apparatus 100 of the present disclosure, referring to FIGS. 2 to 6. The lens part 30 may include at least one lens in a strip shape and with a convex lens structure. The lens may converge the light emitted from the display part 110 and the tiled part 120 to the lens to a focal area of the lens, therefore the image brightness in the tiled area PP is improved while ensuring the continuity of the displayed image, and the technical problem of uneven display in the tiled apparatus 100 are improved.

It should be noted that the lens may be a conventional convex lens or a Fresnel lens 310. Taking the Fresnel lens 310 as an example to explain the technical solutions of the present disclosure in the following description.

Referring to FIGS. 2 to 6. The lens may be the Fresnel lens 310, which has a convex lens structure 311 and at least one toothed structure 312 disposed on both sides of the convex lens structure 311. At least one toothed structure 312 partially overlaps with the display part 110 of a corresponding display panel 10.

Figure 6:
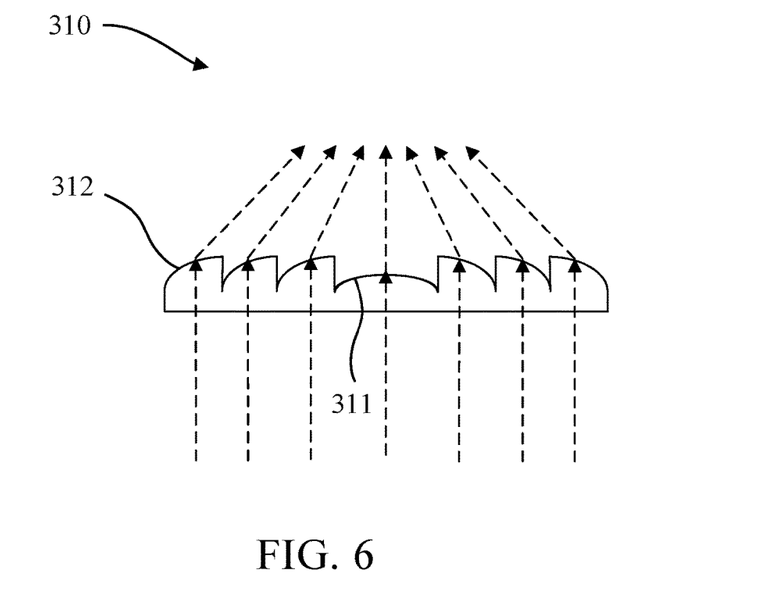
FIG. 6 is an optical path structure view of a Fresnel lens of the tiled apparatus provided by the present disclosure.

In the structure of FIG. 6, the Fresnel lens 310, also known as a threaded lens, is made of a thin sheet of polyolefin material injected or made of glass. One side of the Fresnel lens 310 is a plane, and the other side is removed as much optical material as possible to reduce a thickness and retain surface curvature, forming a plurality of the toothed structures 312 on both sides of the convex lens structure 311. The conventional Fresnel lens has several annular toothed structures disposed in a concentric circle, and a convex lens structure surrounded by the annular toothed structures. In the present disclosure, in order to guide the image of the non-tiled area NP to the tiled area PP, the Fresnel lens 310 is arranged in a long strip shape, that is, each cross-sectional of the Fresnel lens 310 is the structure shown in FIG. 6.

In the structure of FIG. 6, after the light incident on the tiled part 120 enters the Fresnel lens 310, due to the action of the plurality of toothed structures 312 and the convex lens structure 311, the incident light may converge to the focal point of the Fresnel lens 310.

Figure 4:
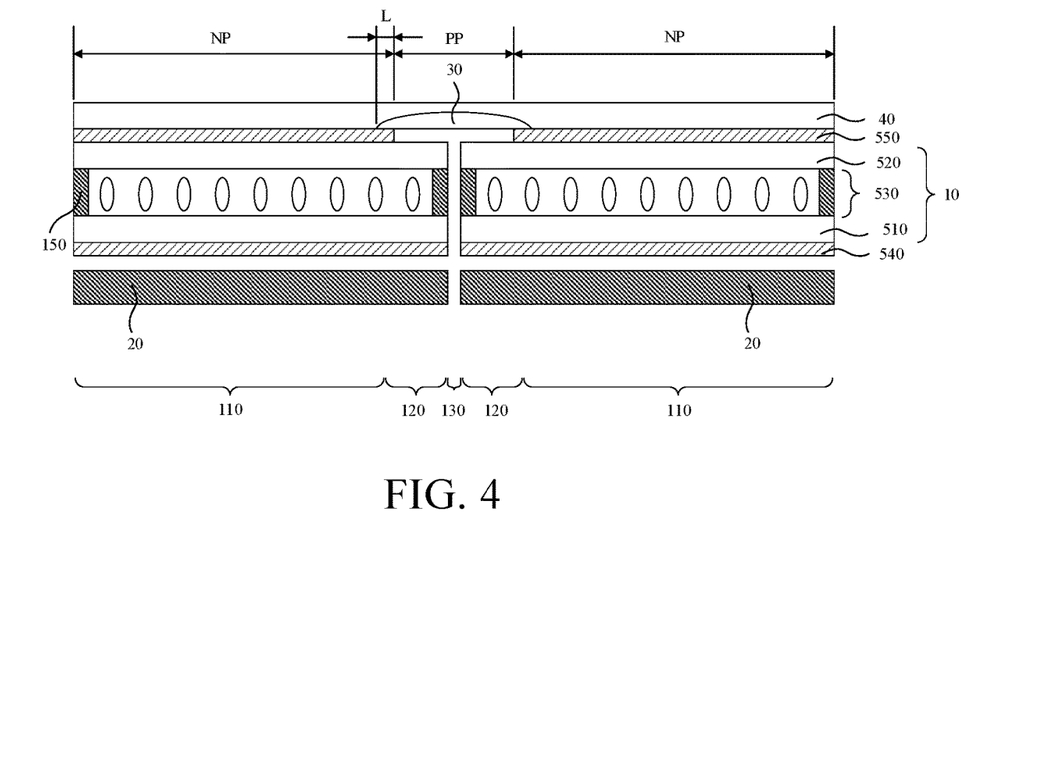
FIG. 4 is a second cross-sectional view of the section AA in FIG. 1.

In the tiled apparatus 100 of the present disclosure, referring to FIGS. 2 and 4. The lens part 30 may include a Fresnel lens 310 in a strip shape, which simultaneously covers the tiled parts 120 of the two display panels 10 and the seam 130. A part of the first toothed structures 312 on a first side of the Fresnel lens 310 overlaps with the tiled part 120 on one side, and a part of the second toothed structures 312 on a second side of the Fresnel lens 310 overlaps with the tiled part 120 on the other side. The convex lens structure 311 of the Fresnel lens 310 covers parts of the tiled parts 120 of the two display panels 10 and the seam 130. The overlapping areas of the toothed structure 312 on both sides of the Fresnel lens 310 and the corresponding display part 110 are the same.

In an embodiment, an orthographic projection of a focus of the Fresnel lens 310 on the tiled apparatus 100 is located in the seam 130. The light passing through the tiled parts 120 and parts of the display parts 110 converges towards the focal area of the Fresnel lens 310 by the Fresnel lens 310, improving the image brightness in the tiled area PP while ensuring the continuity of the displayed image, and improving the technical problem of uneven display of the tiled apparatus 100.

Figure 5:
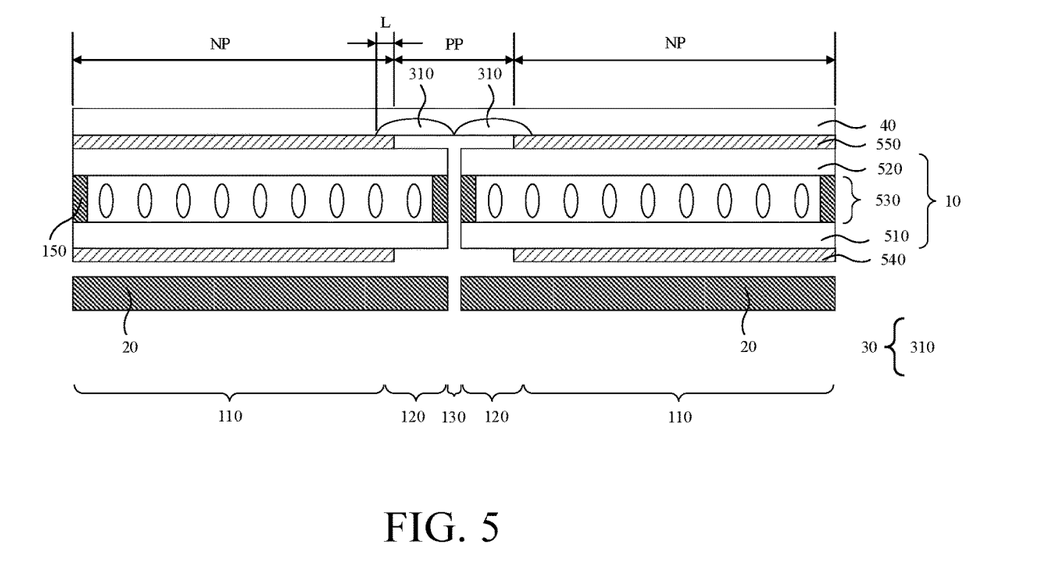
FIG. 5 is a third cross-sectional view of the section AA in FIG. 1.

In the tiled apparatus 100 of the present disclosure, the lens part 30 includes at least two Fresnel lenses 310 connected to each other, at least one Fresnel lens 310 corresponds to a display panel 10. An orthographic projection of the focus of the Fresnel lens 310 on the tiled apparatus 100 is located in the tiled part 120 of a corresponding display panel 10. In the structure of FIG. 5, the lens part 30 includes two Fresnel lenses 310 connected to each other as an example for explanation.

In an embodiment, the two Fresnel lenses 310 are disposed in a strip shape along boundaries of corresponding display panels 10. The two Fresnel lenses 310 are symmetrically disposed with an axis plane O of the two display panels 10 as a symmetry plane, and connection points of the adjacent two Fresnel lenses 310 are located in the axis plane O.

In the embodiment, the light passing through the tiled part 120 and a part of the display part 110 converges towards the focal area of the Fresnel lens 310 by the corresponding Fresnel lens 310. While ensuring the continuity of the displayed images in the two display panels 10, the image brightness in the tiled area PP is improved, and the technical problem of uneven display in the tiled apparatus 100 is improved.

In the tiled apparatus 100 of the present disclosure, referring to FIGS. 2, 4, and 5, the display part 110 includes a plurality of sub pixels, and the lens part 30 covers at least three sub pixels arranged along a first direction, which is parallel to a direction from the display part 110 pointing to the tiled part 120.

In an embodiment, the tiled part 120 is not provided with a corresponding color resistance unit. In order to display image in the tiled area PP, it needs to enlarge the image of the boundary of the non-tiled area NP to the tiled area PP, so that visual continuity of the image between the adjacent two display devices 200 is capable of being achieved. The lens part 30 of the present disclosure overlaps with at least three sub pixels of the display part 110, and the three sub pixels are red sub pixels, green sub pixels, and blue sub pixels. The image of the at least three sub pixels at the boundary of the display part 110 is directed to the tiled area PP to achieve continuous image of the tiled area PP of the tiled apparatus 100.

In the embodiment, along the first direction, an overlapping dimension L between the lens part 30 and the display part 110 is less than or equal to 1 mm. If the lens part 30 covers too many sub pixels, it will affect the image quality of the display part 110. Therefore, the overlap area between the lens part 30 and the display part 110 cannot be too large. A maximum overlap size L of the present disclosure is limited to be 1 mm, so that a large-sized tiled apparatus 100 is capable of achieving visual continuity in the image of the tiled area PP.

In the tiled apparatus 100 of the present disclosure, referring to FIGS. 2, 4, and 5. The tiled apparatus 100 further includes a protective layer 40 located on a side of the display panel 10 away from the backlight module 20. The protective layer 40 covers the lens part 30, and a thickness of the protective layer 40 is greater than or equal to a maximum thickness of the lens part 30.

In an embodiment, the protective layer 40 may cover the display parts 110 and the tiled parts 120. Surfaces of the protective layer 40 away from the backlight module 20 are on the same plane, and distances between the surfaces of the protective layer at different positions on one side away from the backlight module and the backlight module are equal.

In the embodiment, the protective layer 40 is mainly used to protect the lens parts 30 and prevent surfaces of the lens parts 30 from being worn by upper hard film layers. Additionally, the protective layer 40 may further ensure the flatness of the surface of the tiled apparatus 100.

In the embodiment, a material of the protective layer 40 may be an organic material such as polymethyl methacrylate.

Figure 7:
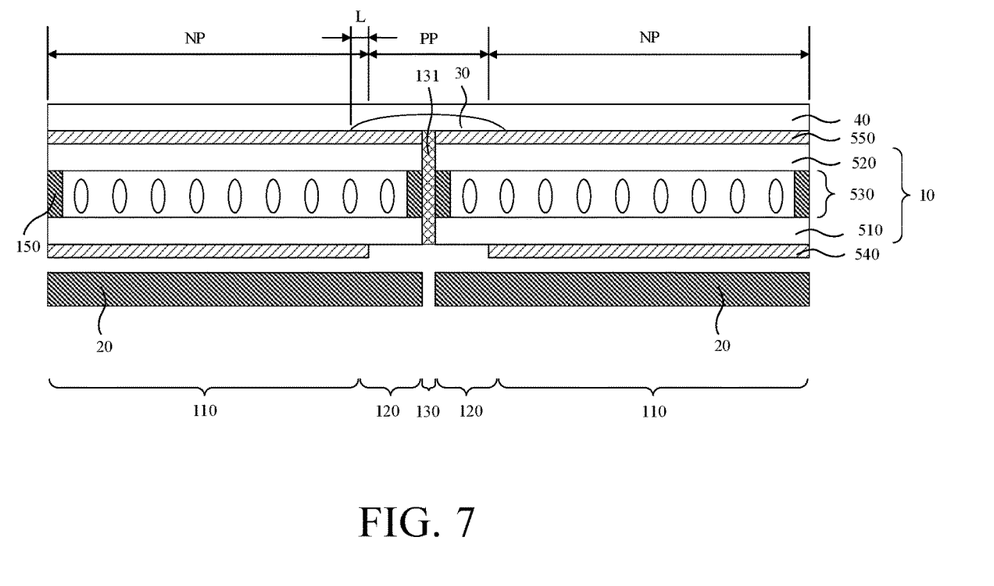
FIG. 7 is a fourth cross-sectional view of the section AA in FIG. 1.

Based on of the above embodiments, referring to FIG. 7, the tiled apparatus 100 may further include a transparent optical adhesive 131 disposed between the two adjacent display panels 10, and the transparent optical adhesive 131 fills the seam 130 between the two display panels 10.

In an embodiment, due to the certain loss rate of the light passing through transparent materials, and the fact that no material is disposed in the seam 130 when the light passes through the seam 130, the amount of light entering the lens 30 is different when the light passes through the seam 120 and the seam 130, resulting in inconsistent display brightness between the seam 130 and the seam 120. The present disclosure balances the transmittance of light passing through the tiled part 120 and the seam 130 by disposing the transparent optical adhesive 131 in the seam 130, and improves the technical problem of inconsistent display brightness between the seam 130 and the tiled part 120.

In the embodiment, a refractive index of the transparent optical adhesive 131 may be the same as that of the first substrate 511 or/and the second substrate 521. Angles at which light enters or exits the substrate are the same, resulting in a smooth transition of the display pictures of the two display panels 10. In addition, the seam 130 is filled with the transparent optical adhesive 131, which is capable of preventing dust or other pollutants during the installation process from entering the tiled display device 200.

In the embodiment, a frame adhesive 150 may be composed of a transparent adhesive material, and an absolute value of difference between a light transmittance of the frame adhesive 150 and a light transmittance of the transparent optical adhesive 131 may range from 0 to 5%.

In the tiled apparatus 100 of the present disclosure, referring to the structures of FIGS. 2 and 3. The first polarizer 540 and the second polarizer 550 are generally disposed in an orthogonal manner. At a side view angle of the tiled apparatus 100, the light emitted by the light-emitting component in the display part 110 enters the tiled part 120 through the first polarizer 540, and passes through the second polarizer 550 in the tiled area PP, so that the user may observe the bright line in the tiled area PP, which causing a technical problem of light leakage at the side view angle of the tiled apparatus 100. The existing technology usually adds a compensation film in the first polarizer 540 and the second polarizer 550 to improve the problem of light leakage at the side view angle. However, the compensation film usually needs to be matched with a liquid crystal gap of the display part 110. Therefore, a liquid crystal gap in the tiled area PP needs to match a liquid crystal gap in the tiled part 120 to improve the problem of light leakage at the side view angle.

In the tiled apparatus 100 of the present disclosure, referring to FIG. 3, the tiled part 120 includes the frame adhesive 150 and a support part 140. The frame adhesive 150 is disposed at a boundary of the display panel 10, and the support part 140 is disposed between the frame adhesive 150 and the display part 110. The frame adhesive 150 and the support part 140 are disposed between the first substrate 511 and the second substrate 521.

In an embodiment, the support part 140 includes support body 141 in a strip shape and a plurality of first main spacer columns 142 disposed on the support body 141. In a top view direction of the tiled apparatus 100, an area of the first main spacer column 142 is smaller than that of the support body 141.

In the embodiment, a material of the first main spacer column 142 and a material of the support body 141 may be the same and may be composed of transparent flexible materials.

In the embodiment, without disposing the support part 140, an area between the display part 110 and the frame adhesive 150 is filled with liquid crystals, and the liquid crystal gap in the area is larger than the liquid crystal gap in the display part 110. Therefore, the liquid crystal gap in the area does not match the liquid crystal gap in the display part 110. Referring to FIG. 3. The support body 141 in the present disclosure is in a strip shape, and the liquid crystal gap M2 in an area where the support body 141 is located is smaller than the liquid crystal gap in the area where the support body 141 is not provided, so that the liquid crystal gap M2 in the area where the support body 141 is located is close to or equal to the liquid crystal gap M1 in the display part 110, solving the technical problem of light leakage at the side view angle of the tiled apparatus 100.

In the embodiment, the plurality of the first main spacer columns 142 are connected to the support bodies 141 and the second substrate 521, and the plurality of the first main spacer columns 142 are mainly used to adjust a spacing of a liquid crystal cell in the area to avoid the spacing of the liquid crystal cell in the area being smaller than a spacing of a liquid crystal cell in the display part 110.

In the tiled apparatus 100 of the present disclosure, referring to FIG. 3, the display part 110 further includes a second main spacer column 518, and an absolute value of difference between a thickness of the first main spacer column 142 and a thickness of the second main spacer column 518 ranges from 0 to 0.2 microns.

In the embodiment, the thickness of the first main spacer column 142 and the thickness of the second main spacer column 518 may be equal.

In the embodiment, the first main spacer column 142 and the second main spacer column 518 may be formed by a same mask process, simplifying the manufacturing process while ensuring the liquid crystal cell spacing of the tiled part 120. In addition, the thickness of the first main spacer column 142 is equal to the liquid crystal gap in the area where the support body 141 is located, and the thickness of the second main spacer column 518 is equal to the liquid crystal gap in the display part 110. Therefore, the thickness of the first main spacer column 142 of the present disclosure is controlled to make the liquid crystal gap in the area where the support body 141 is located equal to the liquid crystal gap in the display part 110. The technical problem of light leakage at the side view angle of the tiled apparatus 100 is solved.

In the embodiment, the second main spacer column 518 may be disposed on structures in a non-transparent area such as a thin film transistor or gate line to avoid the second main spacer column 518 affecting the transmittance of a transparent area of the display panel 110. The second main spacer column 518 is mainly used to adjust the liquid crystal cell spacing of the display panel 110.

In the embodiment, since the relevant metal wirings or non-transparent materials of the present disclosure may be disposed at the boundary of the non-tiled area, and the tiled part is only composed of transparent materials, a size of the tiled part of the present disclosure may be less than 300 microns. In addition, due to the fact that the image of the tiled part is directed towards the tiled part after being enlarged by the image of the display part, if the size of the tiled part is too large, the image resolution of the area is too low, and it cannot achieve visual continuity with the high-resolution image of the display part. Therefore, the size of the tiled part in the present disclosure may be less than or equal to 3 mm.

Since the light entering the Fresnel lens 310 converges to the focus area of the Fresnel lens 310, that is, the light entering the seam 130 comes from the light passing through the tiled part 120 and part of the display part 110, and the position corresponding to the seam 130 in the backlight module is not provided with a light-emitting component 220, so the image brightness of the seam 130 is less than the brightness of the area around the seam 130, causing uneven display in the tiled area PP.

Figure 8:
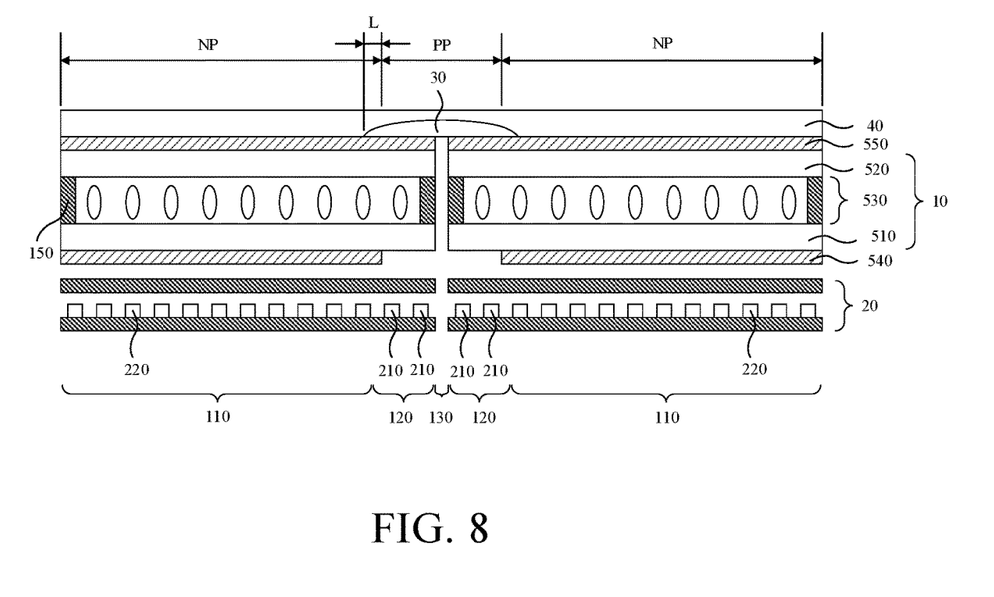
FIG. 8 is a fifth cross-sectional view of the section AA in FIG. 1.

Referring to FIG. 8, The backlight module 20 may be a straight down backlight module, and the backlight module 20 may include a light-emitting component 220 and a light compensating component 210. In the top view direction of the tiled apparatus 100, the light-emitting component 220 overlaps with the display part 110, and the light compensating component 210 overlaps with the tiled part 120.

In an embodiment, a plurality of the light compensating components 210 are disposed on the backlight module 20 in the present disclosure, which ensures that the light emitted by the light compensating components 210 may directly enter the tiled part 120, and the light incident on the tiled part 120 may be converged to the area where the seam 130 is located with the help of the lens part 30. The technical problem of inconsistent brightness between the seam 130 and the seam 120 in the tiled area PP is improved.

In the embodiment, the light compensating component 210 may be Micro LEDs, and the light-emitting component 220 may be LEDs, Mini LEDs or Micro LEDs.

Figure 9:
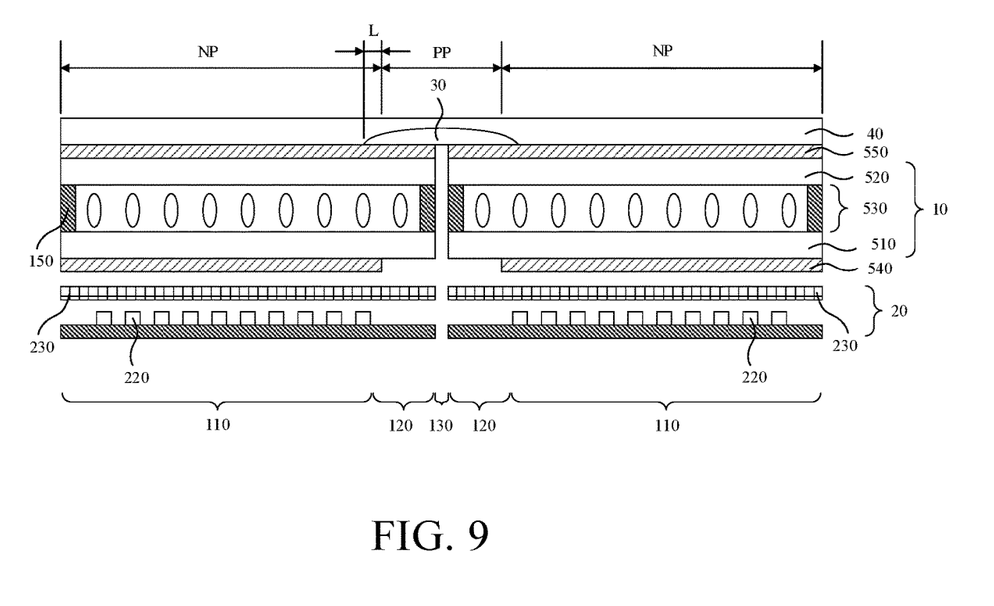
FIG. 9 is a sixth cross-sectional view of the section AA in FIG. 1.

Referring to FIG. 9, the backlight module 20 may be a straight down backlight module, and the backlight module 20 may include a light-emitting component 220 and a diffusion plate 230, and the diffusion plate 230 is disposed on a side of the light-emitting component 220 close to the display panel 10. In the top view direction of the tiled apparatus 100, the light-emitting component 220 overlaps with the display part 110, and the diffusion plate 230 extends to an area where the tiled part 120 is located.

In an embodiment, the diffusion plate 230 extends to the area where the tiled part 120 is located in the present disclosure, so that part of the light emitted by the light-emitting component 220 overlapping with the display part 110 is capable of diffusing to the tiled part 120 through the diffusion plate 230. Combining with the lens part 30, the light incident on the tiled part 120 is converged to the area where the seam 130 is located, and the technical problem of inconsistent brightness between the seam 130 and tiled part 120 in the tiled area PP is solved.

In the embodiment, the light-emitting component 220 may be LEDs, Mini LEDs or Micro LEDs.

Figure 10:
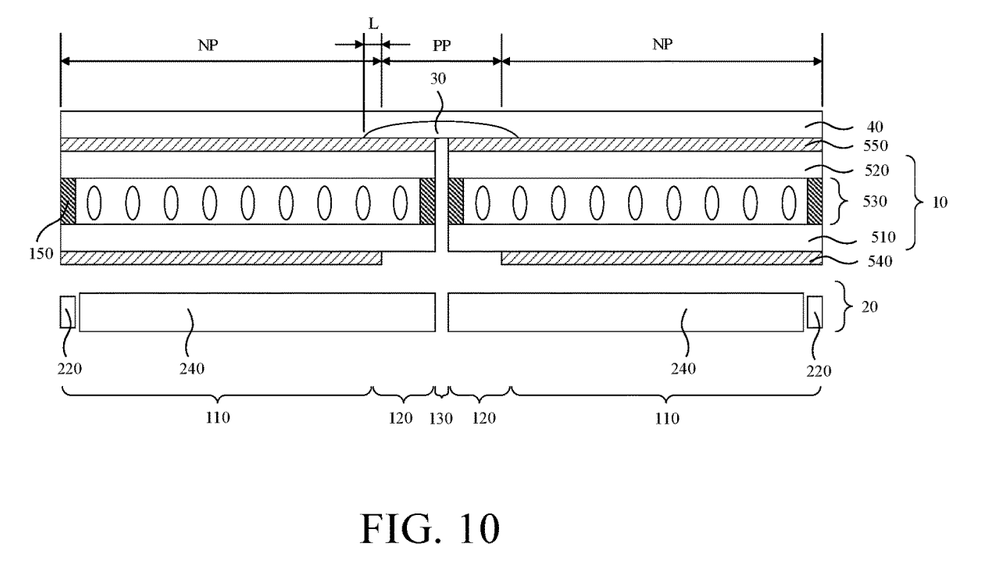
FIG. 10 is a seventh cross-sectional view of the section AA in FIG. 1.

Referring to FIG. 10, the backlight module 20 may be a side entry backlight module, and the backlight module 20 may include a light-emitting component 220 and a light guide plate 240. In the top view direction of the tiled apparatus 100, the light guide plate 240 extends from an area where the display part 110 is located to an area where the tiled part 120 is located.

In an embodiment, the light guide plate 240 extends from the area where the display part 110 is located to the area where the tiled part 120 is located in the present disclosure, so that the light emitted by the light-emitting component 220 is capable of being imported to the tiled part 120 through the light guide plate 240. Combining with the lens part 30, the light incident on the tiled part 120 is converged to the area where the seam 130 is located, and the technical problem of inconsistent brightness between the seam 130 and tiled part 120 in the tiled area PP is solved.

In the embodiment, the light-emitting component 220 may be LEDs or Mini LEDs.

In the above embodiment, the size of the LED is in millimeters. The size of the Mini LED is in micrometers, such as ranging from 50 microns to 200 microns. The size of the Micro LED is in nanometers, such as less than 10 microns.

It can be understood that, for those skilled in the art, equivalent replacements and modifications can be made according to the technical solution and disclosure ideas thereof of the present disclosure, and all these modifications or replacements are considered within the protection scope of the attached claims of the present disclosure.

What is claimed is:

1. A tiled apparatus, comprising at least two display devices tiled with each other, wherein a seam is defined between adjacent two display devices, and each display device comprises:
    a display panel comprising a display part and a tiled part located on a side of the display part, wherein tiled parts of the adjacent two display devices are adjacent to each other, and the tiled parts are composed of transparent materials; and
    a backlight module disposed on a side of the display panel away from a display surface, wherein an orthographic projection of the backlight module on the display panel covers the display part and at least a part of the tiled part, and light emitted from an area of the backlight module corresponding to the tiled part is capable of passing through the tiled part;
    wherein the tiled apparatus further comprises a lens part disposed on a side of the display panel away from the backlight module, the lens part covers adjacent two tiled parts and the seam, and the lens part partially overlaps with display parts of adjacent two display panels;
    wherein the lens part comprises at least one lens in a strip shape and with a convex lens structure.

2. The tiled apparatus of claim 1, wherein the display device further comprises a first polarizer and a second polarizer disposed on both sides of the display panel, and at most one of the first polarizer and the second polarizer overlaps with the tiled part.

3. The tiled apparatus of claim 1, wherein the lens is a Fresnel lens, the Fresnel lens comprises the convex lens structure and at least one toothed structure disposed on both sides of the convex lens structure, and the at least one toothed structure partially overlaps with the display part of a corresponding display panel.

4. The tiled apparatus of claim 1, wherein the lens part comprises one lens, and an orthographic projection of a focus of the lens on the tiled apparatus is located in the seam.

5. The tiled apparatus of claim 1, wherein the lens part comprises at least two lenses connected to each other, at least one lens corresponds to a display panel, and an orthographic projection of a focus of the lens on the tiled apparatus is located in the tiled part of a corresponding display panel.

6. The tiled apparatus of claim 1, wherein the display part comprises a plurality of sub pixels, and the lens part covers at least three of the sub pixels disposed along a first direction; and
   wherein the first direction is parallel to a direction from the display part pointing to the tiled part.

7. The tiled apparatus of claim 1, wherein the tiled apparatus further comprises a protective layer disposed on a side of the display panel away from the backlight module, the protective layer covers the display part and the tiled part, a thickness of the protective layer is greater than or equal to a maximum thickness of the lens part, surfaces of the protective layer away from the backlight module are on a same plane, and distances between the surfaces of the protective layer at different positions on one side away from the backlight module and the backlight module are equal.

8. The tiled apparatus of claim 7, wherein a material of the protective layer is polymethyl methacrylate.

9. The tiled apparatus of claim 1, wherein the backlight module is a straight down backlight module, which comprises a light-emitting component and a light compensating component; and
   wherein in a top view direction of the tiled apparatus, the light-emitting component overlaps with the display part, and the light compensating component overlaps with the tiled part.

10. The tiled apparatus of claim 9, wherein the light compensating component is Micro light-emitting diodes (LEDs), and the light-emitting component is LEDs, Mini LEDs or Micro LEDs.

11. The tiled apparatus of claim 1, wherein the backlight module is a straight down backlight module, which comprises a light-emitting component and a diffusion plate, and the diffusion plate is disposed on a side of the light-emitting component close to the display panel; and
   wherein in a top view direction of the tiled apparatus, the light-emitting component overlaps with the display part, and the diffusion plate extends to an area where the tiled part is located.

12. The tiled apparatus of claim 1, wherein the backlight module is a side entry backlight module comprising a light-emitting component and a light guide plate; and
   wherein in a top view direction of the tiled apparatus, the light guide plate extends from an area where the display part is located to an area where the tiled part is located.

13. A tiled apparatus, comprising at least two display devices tiled with each other, wherein a seam is defined between adjacent two display devices, and each display device comprises:
   a display panel comprising a display part and a tiled part located on a side of the display part, wherein tiled parts of the adjacent two display devices are adjacent to each other, and the tiled parts are composed of transparent materials; and
   a backlight module disposed on a side of the display panel away from a display surface, wherein an orthographic projection of the backlight module on the display panel covers the display part and at least a part of the tiled part, and light emitted from an area of the backlight module corresponding to the tiled part is capable of passing through the tiled part;
   wherein the tiled apparatus further comprises a lens part disposed on a side of the display panel away from the backlight module, the lens part covers adjacent two tiled parts and the seam, and the lens part partially overlaps with display parts of adjacent two display panels;
   wherein an overlap size between the lens part and the display part is less than or equal to 1 mm.

14. A tiled apparatus, comprising at least two display devices tiled with each other, wherein a seam is defined between adjacent two display devices, and each display device comprises:
   a display panel comprising a display part and a tiled part located on a side of the display part, wherein tiled parts of the adjacent two display devices are adjacent to each other, and the tiled parts are composed of transparent materials; and
   a backlight module disposed on a side of the display panel away from a display surface, wherein an orthographic projection of the backlight module on the display panel covers the display part and at least a part of the tiled part, and light emitted from an area of the backlight module corresponding to the tiled part is capable of passing through the tiled part;
   wherein the tiled apparatus further comprises a lens part disposed on a side of the display panel away from the backlight module, the lens part covers adjacent two tiled parts and the seam, and the lens part partially overlaps with display parts of adjacent two display panels;
   wherein the tiled part comprises a frame adhesive disposed at a boundary of the display panel and a support part disposed between the frame adhesive and the display part; and
   wherein the support part comprises a support body and a first main spacer column disposed on the support body, and in a top view direction of the tiled apparatus, an area of the first main spacer column is smaller than an area of the support body.

15. The tiled apparatus of claim 14, wherein the display part further comprises a second main spacer column, and an absolute value of difference between a thickness of the first main spacer column and a thickness of the second main spacer column ranges from 0 to 0.2 microns.

16. The tiled apparatus of claim 15, wherein the thickness of the first main spacer column is equal to the thickness of the second main spacer column.

17. The tiled apparatus of claim 14, wherein the seam between the adjacent two display devices is filled with a transparent optical adhesive.

18. The tiled apparatus of claim 17, wherein an absolute value of difference between a light transmittance of the frame adhesive and a light transmittance of the transparent optical adhesive ranges from 0 to 5%.

19. The tiled apparatus of claim 17, wherein a refractive index of the transparent optical adhesive is same as a refractive index of a substrate of the display panel.

* * * * *